United States Patent

Raju et al.

[11] Patent Number: 6,067,541
[45] Date of Patent: May 23, 2000

[54] MONITORING DOCUMENT CHANGES IN A FILE SYSTEM OF DOCUMENTS WITH THE DOCUMENT CHANGE INFORMATION STORED IN A PERSISTENT LOG

[75] Inventors: Sitaram C. V. Raju; Srikanth Shoroff; Kyle G. Peltonen, all of Issaquah, Wash.

[73] Assignee: Microsoft Corporation, Redmond, Wash.

[21] Appl. No.: 08/932,714

[22] Filed: Sep. 17, 1997

[51] Int. Cl.[7] .................................................. G06F 17/30
[52] U.S. Cl. .............................. 707/3; 707/201; 707/202; 707/204
[58] Field of Search ................................ 707/3, 100, 104, 707/200, 201, 203, 202, 204; 364/282.1, 283.1, 283.3

[56] References Cited

U.S. PATENT DOCUMENTS

| 5,481,699 | 1/1996 | Saether | 395/182.13 |
|---|---|---|---|
| 5,485,608 | 1/1996 | Lomet et al. | 707/202 |
| 5,506,983 | 4/1996 | Atkinson et al. | 707/1 |
| 5,617,566 | 4/1997 | Malcolm | 395/620 |
| 5,740,432 | 4/1998 | Mastors | 707/202 |
| 5,799,324 | 8/1998 | McNutt et al. | 707/206 |
| 5,878,414 | 3/1999 | Hsiao et al. | 707/8 |
| 5,890,154 | 3/1999 | Hsiao et al. | 707/8 |
| 5,903,898 | 5/1999 | Cohen et al. | 707/204 |
| 5,907,848 | 5/1999 | Zaiken et al. | 707/202 |

FOREIGN PATENT DOCUMENTS

| 0 778 527 | 6/1997 | European Pat. Off. | G06F 17/307 |
|---|---|---|---|
| 94/29801 | 12/1994 | WIPO | G06F 15/20 |

OTHER PUBLICATIONS

Green, et al., "Designing a fast, on-line backup system for a log-structured file system," *Digital Technical Journal*, vol. 8, No. 2, pp. 32–45 (1996).

Copy of Written Opinion in Corresponding PCT Application No. PCT/US 98/19048.

Primary Examiner—Paul R. Lintz
Assistant Examiner—Ella Colbert
Attorney, Agent, or Firm—The Law Offices of Albert S. Michalik

[57] ABSTRACT

A method and system for improved monitoring of document changes in a search engine by an indexing program. Once an indexing or other such monitoring program is halted, upon restart the monitoring program needs to update its own files and its indexes to reflect document changes that occurred while halted. A file system such as the Windows NT file system persistently logs document change information on disk in a monotonically increasing, uniquely-numbered persistent record, which further identifies the file that has changed. The method and system utilize the logged change information to efficiently maintain the indexes, and to rapidly update the indexes after a shutdown and subsequent restart.

44 Claims, 11 Drawing Sheets

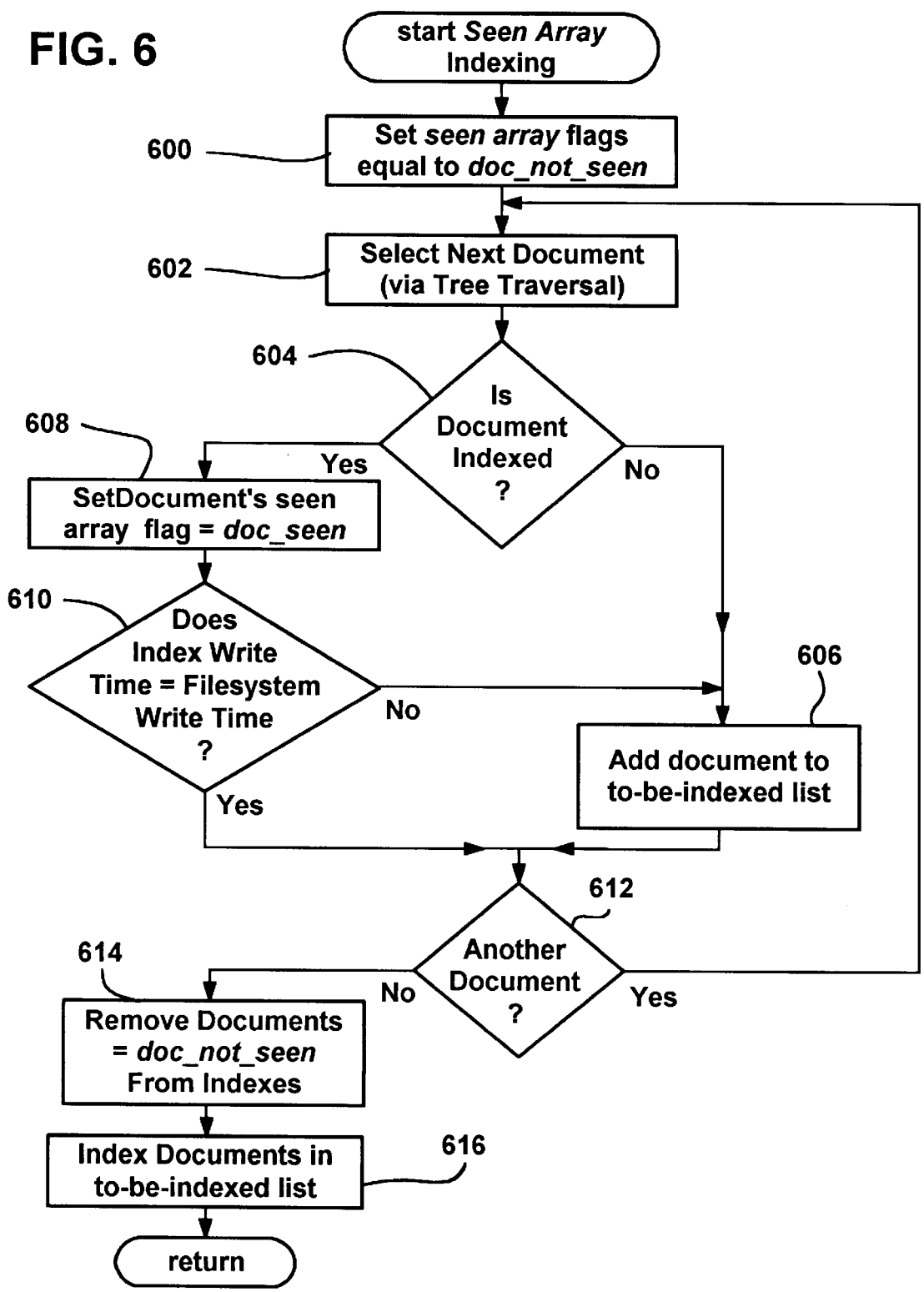

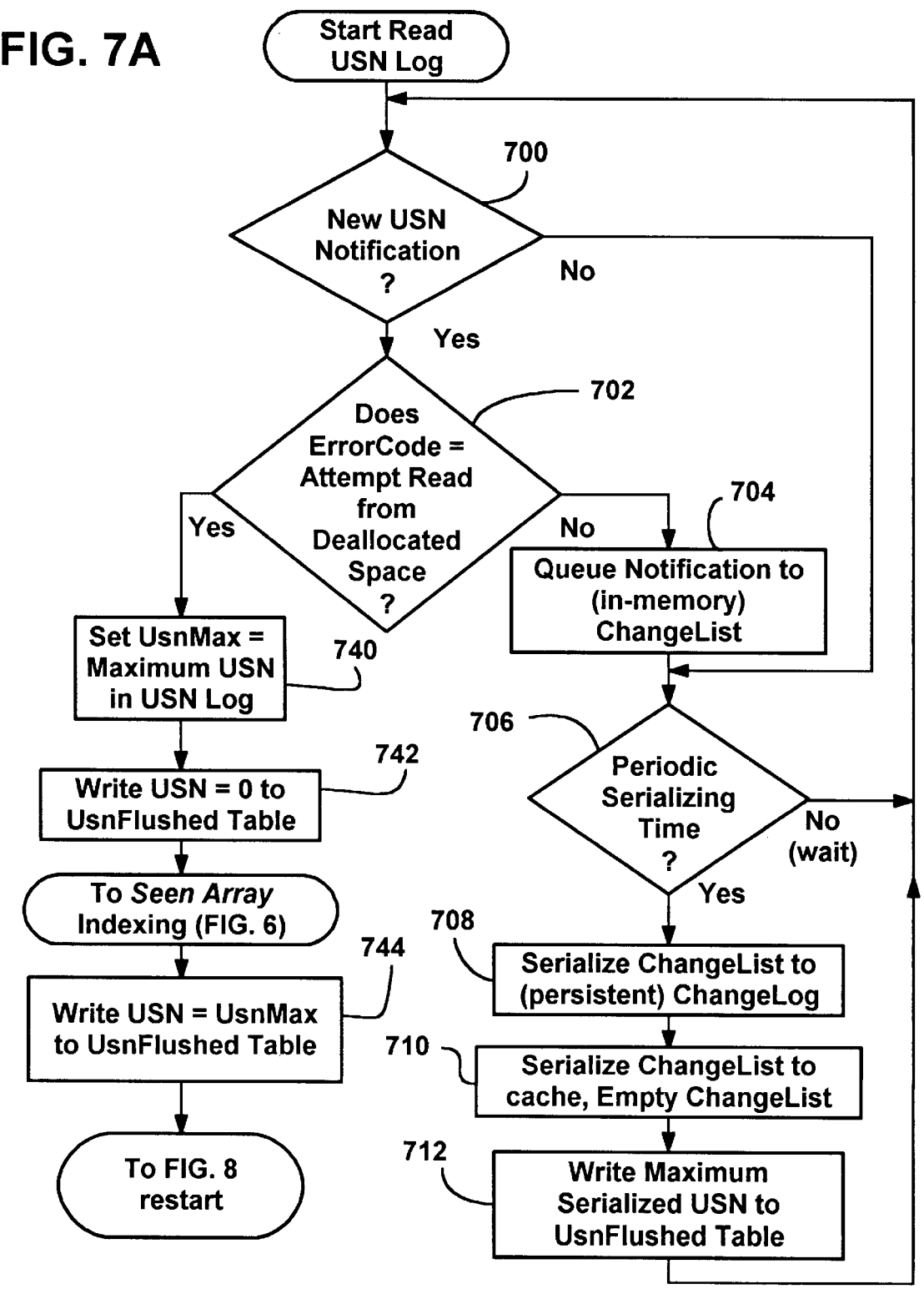

MONITORING DOCUMENT CHANGES IN A FILE SYSTEM OF DOCUMENTS WITH THE DOCUMENT CHANGE INFORMATION STORED IN A PERSISTENT LOG

FIELD OF THE INVENTION

The invention relates generally to computers and file systems, and more particularly to monitoring document changes when indexing the contents and properties of documents on a file system.

BACKGROUND OF THE INVENTION

Programs which track file activity on a file system, such as a program that automatically generates and maintains an index of a file system's documents, are becoming important user tools. This is particularly true as storage mechanisms store an ever-increasing number of files. For example, Microsoft Corporation's Index Server product indexes the contents and properties of documents on one or more file systems, and provides users with a search engine to query the index and quickly locate matching documents. A desirable feature of Index Server is that it runs in the background to automatically keep its internal indexes up-to-date as the user modifies documents. Newly created documents are indexed, modified documents are re-indexed, and deleted documents are removed from Index Server's indexes as the user changes them. Index Server monitors the file system for changes to documents using Win32 Application Programming Interfaces (APIs) FindFirstChangeNotification and FindNextChangeNotification. These APIs function reasonably well but inefficiently, as they provide information on virtually all file activity, including transitory information that is not important to the overall indexing scheme. Moreover, existing mechanisms often provide change notification before the document is available for indexing, (e.g., when the file is still locked open by the user).

While Index Server and other such programs have thus become important user tools, under certain circumstances such programs are halted. The user can continue to modify documents even when these background programs are halted, however, resulting in a situation in which the file system activity is not properly tracked. For example, Index Server may crash due to a program error, a condition referred to as an abrupt shutdown. For a dynamic indexing program such as Index Server, this results in out-of-date indexes. Moreover, a feature of Index Server is that during low resource conditions, (e.g., disk space is low), the program will stop accepting document change notifications. The user can continue to make document changes during the low resource condition, however Index Server's indexes are not kept up-to-date as the Index Server program will not accept changes until sufficient disk space becomes available. Again, such a situation results in out-of-date indexes.

Once the indexes become out-of-date, Index Server needs to determine the list of documents that were changed since Index Server was halted or since it stopped accepting change information. One possible solution is to simply re-index all files from scratch upon every start-up, however this solution becomes unacceptably slow even with only a few thousand documents.

A more sophisticated solution is to compare each document in the file system with the information on that file maintained in Index Server's indexes, and synchronize any differences between the two. Properties stored in the index include the document name, the physical path of the document, the write time, i.e., the time that the file was last modified, and the document's ID, which is a unique identifier for every document in the internal index. After start-up, a tree traversal of the indexed volume is performed, which scans every file on the indexed volume. The tree traversal may use well-known algorithms such as a breadth-first or depth-first searching algorithms. During the tree traversal, a process looks for whether documents present in the file system are also present in the index. Documents which are not present in the indexes but are seen in the file system are new documents that were created after the shutdown of Index Server, and thus each such document is added to a list of documents to be indexed. Conversely, documents which are present in the indexes but are not seen in the file system are documents that were deleted after shutdown of Index Server, and thus each such document is removed from the internal indexes. For documents that exist in the internal indexes and that are seen during the tree traversal, the current write time of the document in the file system is compared with the write time of that document in the internal indexes. Those documents having write times in the file system that are more recent than the write times in the indexes have been modified since the shutdown, and are thus re-indexed.

While the above-described tree-traversal solution is significantly faster than re-indexing all documents at start-up, the solution is still too slow for large indexes. For example, indexes having hundreds of thousands or even millions of documents may require a processing time on the order of hours to complete this process. As indexes grow larger and larger, the time becomes even more unacceptable.

OBJECTIVES AND SUMMARY OF THE INVENTION

Accordingly, it is an objective of the present invention to provide an improved method and system for determining which documents have changed between a shutdown and a start-up of a file system activity-tracking program.

In accomplishing that objective, it is a related objective to provide a method and system as characterized above that determines the changed documents in a substantially faster manner.

Another objective of the present invention is to provide the method and system for use with a document indexing program.

Yet another object of the present invention is to make the indexing process more efficient.

Still another objective is to provide a method and system of the above kind that is reliable, robust, efficient, flexible and extensible.

Briefly, in a computer system having a file system of documents, wherein the file system serially stores document change information in a persistent log of records, the present invention provides a method and system for updating at least one other file of document information, such as an index. A record is read from the persistent log, and processed to obtain a document identifier, change information about a document, and a sequence number representative of the relative position of the record in the log file (and thus the relative time of the change). The processing may include placing the record in an in memory queue, serializing the record into persistent storage, and retrieving the record from persistent storage. The index or other file is updated based on the change information of the document that is stored in the record, and the sequence number of the highest record processed is recorded in a persistent data structure.

In the event of a shutdown of the updating / monitoring (e.g., indexing) program, upon restart, the sequence number is retrieved from the persistent data structure, and the index is updated by reading records from the log based on the retrieved sequence number.

Other objects and advantages will become apparent from the following detailed description when taken in conjunction with the drawings.

BRIEF DESCRIPTION OF THE DRAWINGS

FIG. 6 is a flow diagram representing the general steps taken to perform a tree traversal with seen array processing for updating documents;

FIG. 7A is a flow diagram representing the general steps taken to handle notifications in accordance with one aspect of the present invention;

DETAILED DESCRIPTION OF THE PREFERRED EMBODIMENT

Exemplary Operating Environment

Figure 1:
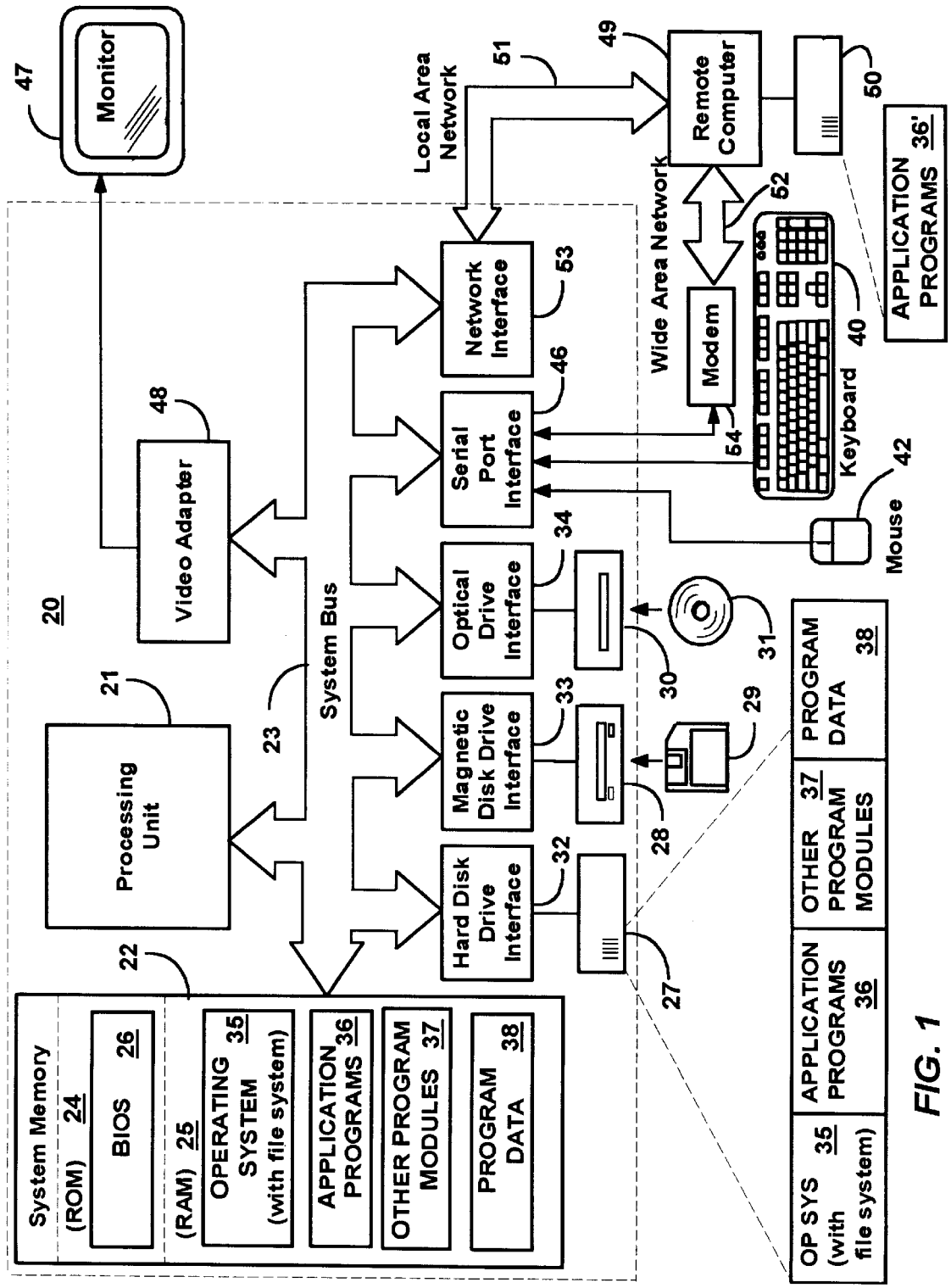
FIG. 1 is a block diagram representing a computer system in which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components and data structures that perform particular tasks or implement particular abstract data types.

Moreover, those skilled in the art will appreciate that the invention may be practiced with other computer system configurations, including hand-held devices, multi-processor systems, microprocessor-based or programmable consumer electronics, network PCs, minicomputers, and mainframe computers. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), and read-only memories (ROMs) may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, or scanner. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet. When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Monitoring Document Changes

For purposes of the present invention, the above-identified computer system 20 preferably includes Microsoft Corporation's Windows NT operating system, the Windows NT file system (NTFS) and Index Server (or another document monitoring program). It should be understood that the present invention is not limited to indexing, but rather applies to any type of program which monitors changes to files of a file system, documents in a search engine, including backup programs, replication programs and similar programs. Moreover, the invention will operate with sources of data other than a file system, such as a database, that is arranged to provide an ordered list of changes to a change monitoring process for modifying a data structure such as an index. Nevertheless, for purposes of simplicity, the present invention will be primarily described with respect to content and property indexing of file system documents, particularly using Microsoft's Index Server 60.

Figure 2:
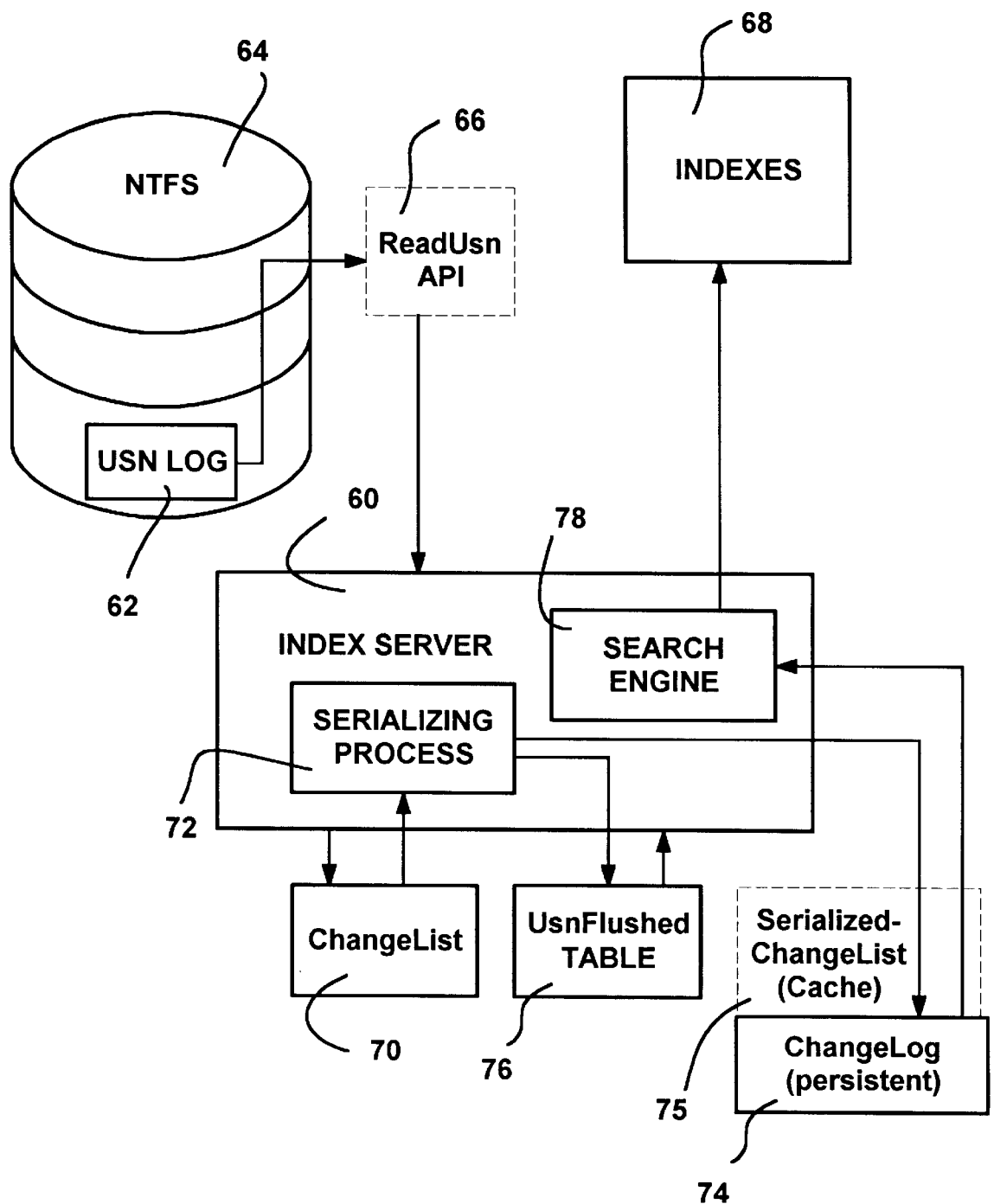
FIG. 2 is a block diagram illustrating various components of the present invention.

As represented in FIG. 2, the Windows NT file system (NTFS) 64 maintains a persistent list of document changes in an Update Sequence Number (USN) Log file 62. More particularly, as files are added, deleted or modified, NTFS appends USN records to a per-volume stream (the USN log file 62) that identify the files and describe the various modifications thereto. Notifications are provided to Index Server 60 from the USN Log file 62 via the NT file system 64.

Figure 3:
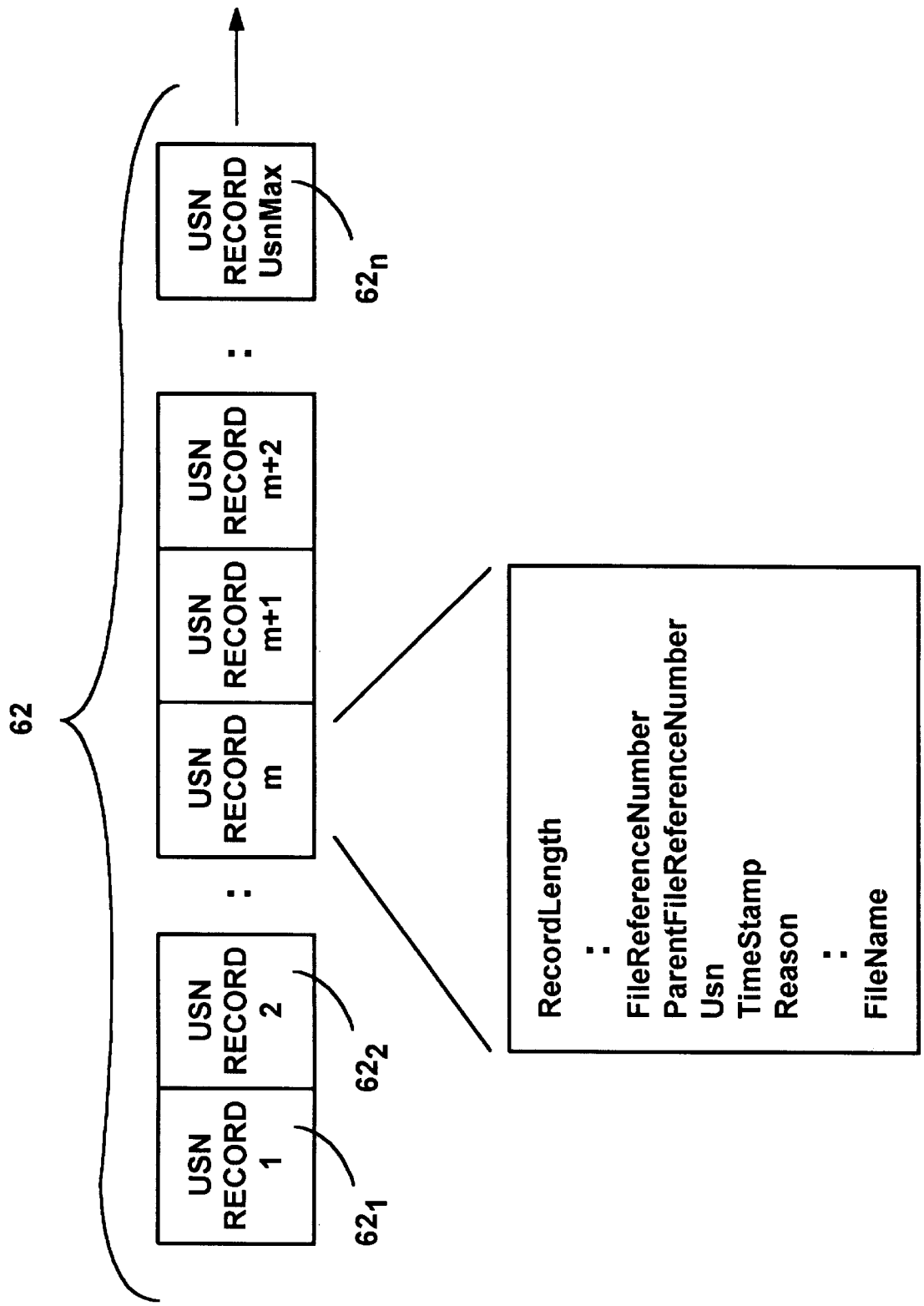
FIG. 3 is a block diagram illustrating a log of USN records maintained by a file system.

As shown in FIG. 3, each USN record $62_1$–$62_n$ includes a document identifier identifying the document that was updated, a timestamp corresponding to the time of the update, a reason field identifying the type of change, and a 64-bit number called the update sequence number (USN). The USN is the offset of a particular record in the stream, and, since records are appended to the stream, USN's possess the property that they are monotonically increasing. For example, if a document named a.doc has been modified before a document named b.doc, then the USN for this particular modification of a.doc is less than the USN for the modification of b.doc. Note that alternative methods for generating USNs are feasible, (e.g., a persistent USN counter on disk that is incremented for every new record), and there is no intention to limit the present invention to any particular implementation thereof. Accordingly, any data that tracks the position of one change relative to other changes (in time or otherwise) may serve as the USN.

The document identifier may be either a number (FileReferenceNumber) that uniquely identifies the documents on a volume or can be the full path (FileName) on a volume, (e.g., c:\directoryl\patent.doc). In this architecture, the kernel-mode file system 64 is responsible for adding notification records, and thus the notifications will continue to be added even if Index Server 60 is shutdown.

Figure 4:
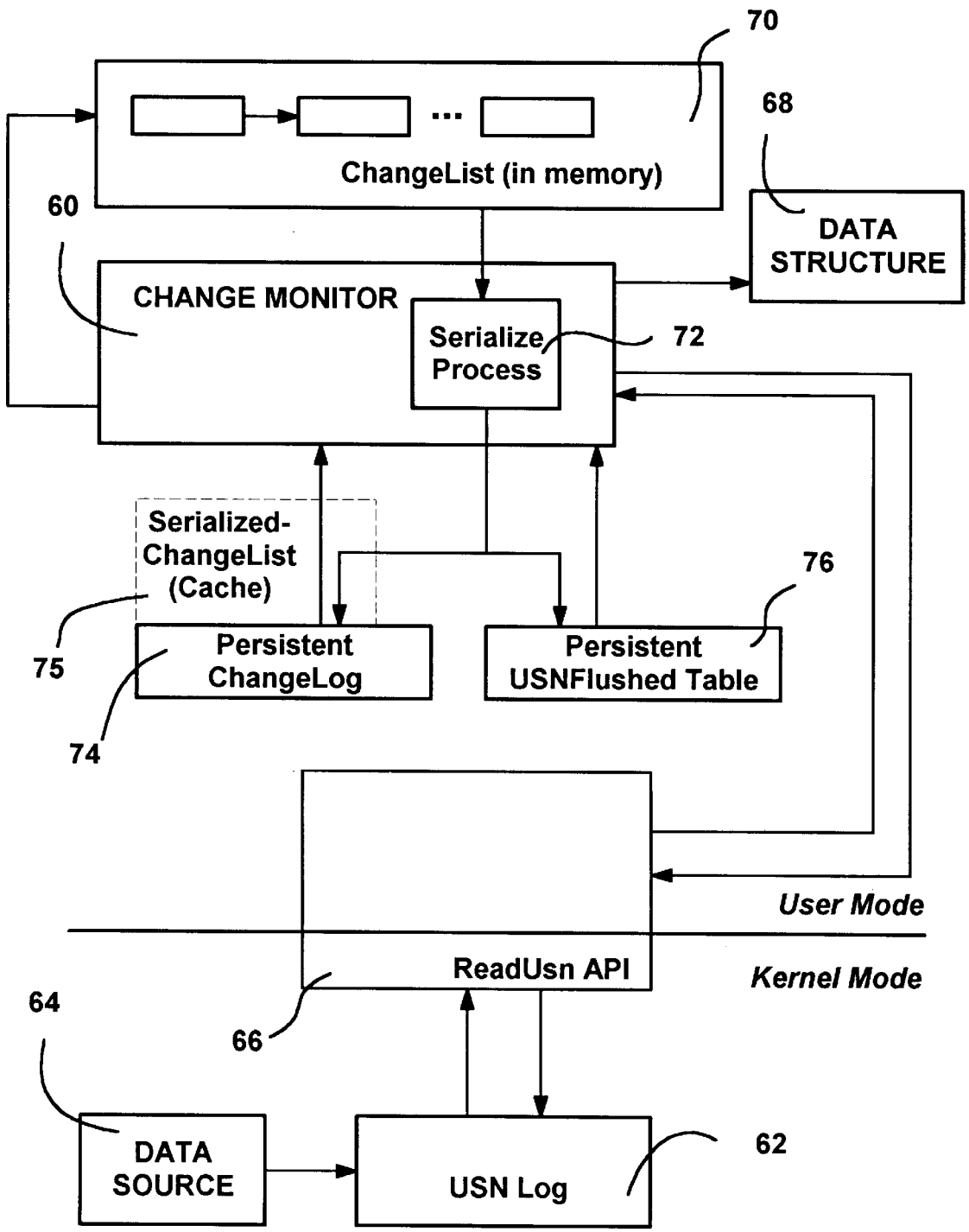
FIG. 4 is a block diagram illustrating various components of the present invention.

Index Server 60 obtains its notifications from the USN Log 62 via the Windows NT file system ReadUsn API 66. As shown in FIG. 4, the ReadUsn API provides an interface for the user-mode change monitoring program such as Index Server 60 to read the kernel-mode USN Log 62, which can receive notifications from any appropriate source of data (e.g., the Windows NT file system 64 or a database). With this API 66, any change monitoring program with the proper security privileges can read the USN Log file 62. The ReadUsn API takes a StartUsn parameter, from which the reading of the USN Log file 62 begins. ReadUsn returns USN records $62^1$–$62_n$ in increasing USN order.

In accordance with one aspect of the present invention, Index Server 60 (or similar change monitoring program) uses these USN record notifications to maintain one or more data structures such as indexes 68. To use the notifications, when a USN notification record (e.g., 62₂) is received by Index Server 60, Index Server 60 queues the notification record in a linked list called the ChangeList 70. For purposes of speed, this ChangeList 70 is maintained in the (high-speed) RAM 25. Index Server 60 then uses a serializing process 72 to periodically serialize the notifications in the ChangeList 70 into a persistent log on the disk called ChangeLog 74. Then, although not necessary to the present invention, the ChangeList 70 may be moved to another in-memory list called the serialized-ChangeList 75, which serves as a cache. Instead of reading from the persistent ChangeLog 74, (described below), which involves disk reads, the serialized-ChangeList 75 may be read for speed purposes. Of course, if the serialized-ChangeList 75 is empty, (e.g., after a restart), then the persistent ChangeLog 74 will be read. In any event, the ChangeList 70 is emptied, and the maximum USN that is serialized from the ChangeList 70 is persistently written to a UsnFlushed table 76. Note that as described in more detail below, a table is used because USNs are per volume, and Index Server 60 supports multiple volumes, each volume having one or more indexes 68 associated therewith.

For maintaining the indexes 68, the notification records are read by Index Server 60 from the head of the ChangeLog 74 (or when records are present, from the in-memory cache, i.e., the serialized-ChangeList 75) by a search engine 78 or similar component. As previously described, each notification record (e.g., 62₂) identifies which document has changed and thus is to be re-indexed, or, if a delete notification record, which document has been deleted and thus is to be removed from the index. Once a document has been successfully indexed or removed, (or after a failure event has been logged if the document cannot be indexed for some reason), the corresponding serialized notification record 622 is removed from the head of the ChangeLog 74. When writing to persistent data structures, well known transaction techniques such as shadow copying or write ahead logging are used to ensure that persistent data structures are not corrupted due to abrupt crashes.

The ReadUsn API 66 may be configured to report file change activity only when the final handle has been closed on the file. As can be appreciated, for indexing purposes this provides a significant efficiency advantage over the use of the FindFirstChangeNotification and FindNextChangeNotification APIs 80, 82 which provide information on virtually all file activity, including transitory information that occurs while the file is open and is possibly inaccessible to the search engine. As described below with reference to FIG. 10, however, these APIs 80, 82 are still generally needed when indexing other file system changes, such as FAT (file allocation table)-based file systems 84.

In keeping with the invention, before a clean (non-abrupt) shut down, Index Server 60 serializes the ChangeList 70 to the persistent ChangeLog 74 without waiting for the serialization period, and persistently writes to the UsnFlushed table 76 the USN of the last change notification that was successfully serialized. After restart, Index Server 60 reads the USN Log 62 starting from this persistently saved USN, and the document name and change information in each USN record (e.g., 621) gives the list of changes. As can be readily appreciated, unlike tree traversal and seen array processing, (described in detail below), the time to determine the list of changes is independent of the size of indexes 68. Typically the number of modifications is small, which means that the USN-based method of the present invention takes seconds to a few minutes to determine the list of changes, which ordinarily is substantially faster than tree-traversal and seen array processing techniques.

Figure 5:
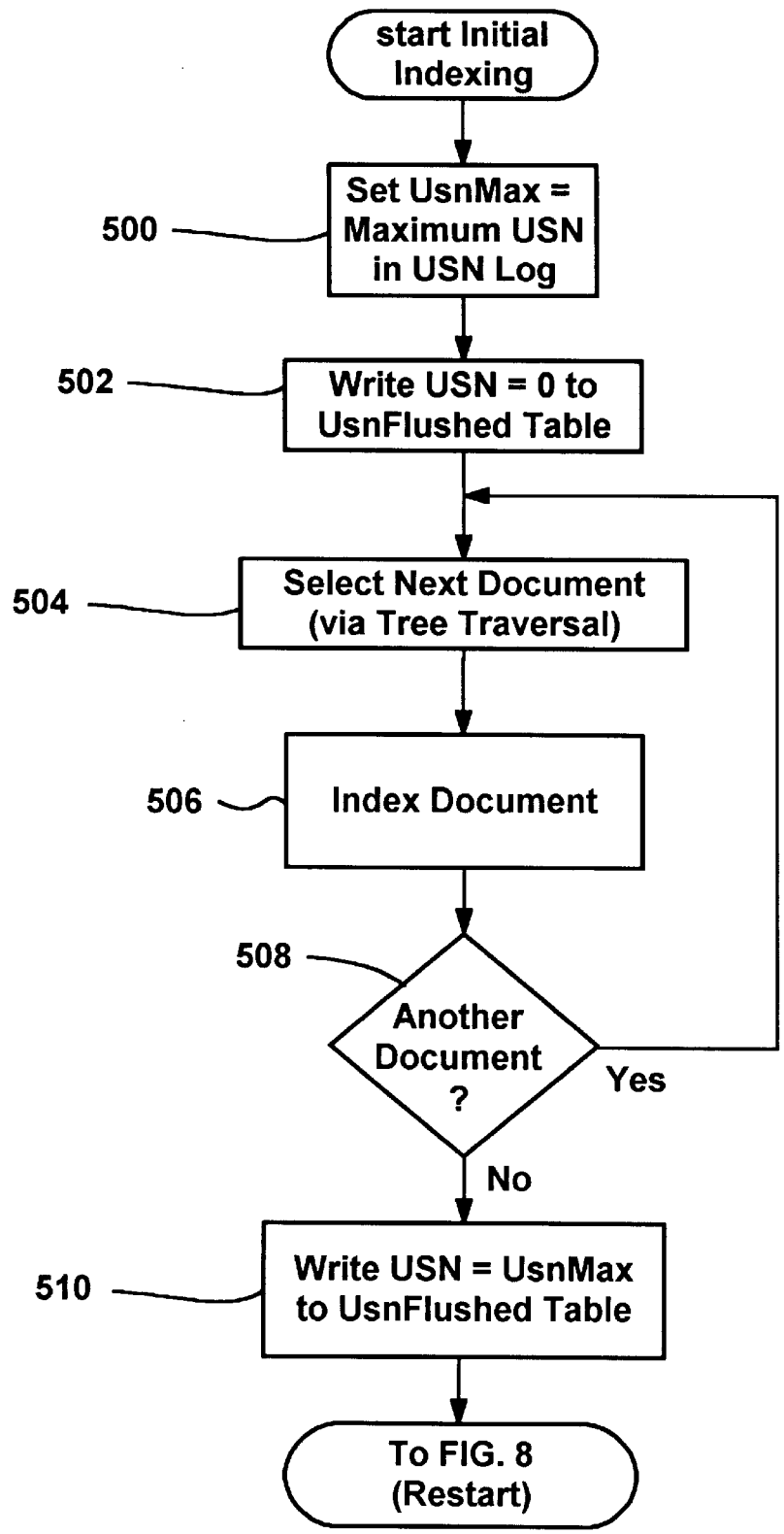
FIG. 5 is a flow diagram representing the general steps taken to initially index a set of documents.

Turning to an explanation of the operation of the invention with particular reference to the flow diagrams of FIGS. 5–8, the first time Index Server 60 is installed and run on a system, all appropriate documents in the file system 64 are indexed. Note that this refers to the very first time Index Server 60 is run, essentially when all indexes are empty. To accomplish the initial indexing, a tree traversal is performed as represented in FIG. 5.

Beginning at step 500 of FIG. 5, a variable UsnMax is set equal to the maximum USN value in the USN Log 62. Note that the maximum USN in the USN Log 62 may be found using the ReadUsn API 66. Next, at step 502, a USN of zero (0) is written to the UsnFlushed table 76. As will be discussed in more detail below, the zero will remain in the UsnFlushed table 76 until the tree traversal indexing completes successfully, providing an indication of whether the documents were indexed properly.

At step 504, the tree traversal indexing process selects a document of the file system 64 using a breadth-first or depth-first search algorithm or similar mechanism. At step 506 the selected document is indexed by Index Server 60. Alternatively, the document may be placed in a list for subsequent indexing by Index Server 60 (e.g., after step 508). In any event, via step 508 the tree traversal continues until all appropriate documents have been scanned. Then, at step 510 the maximum value of the USN in the USN log 62, UsnMax, is written to the UsnFlushed table 76. In this manner, all appropriate documents are initially indexed. While time-consuming, under normal circumstances such an initial scan will not be repeated with the present invention.

Note that an alternative method for updating the index 68, when starting with a clean/empty index, is to avoid the tree traversal and instead process each USN record in the USN log 62 beginning at record one. Note that record one is the first USN notification record after the volume was created or freshly formatted. However, this updating process requires that the USN record one has not been deallocated, as described below. Moreover, this type of updating is generally slower than a tree traversal if the volume has been in use for a long time, as many notification records will exist, possibly more than the current count of files on disk. Of course, such a USN-based index construction process also does not work for volumes that have been upgraded from an earlier format that did not have USN logging to a format that now supports USN logging.

Figure 8:
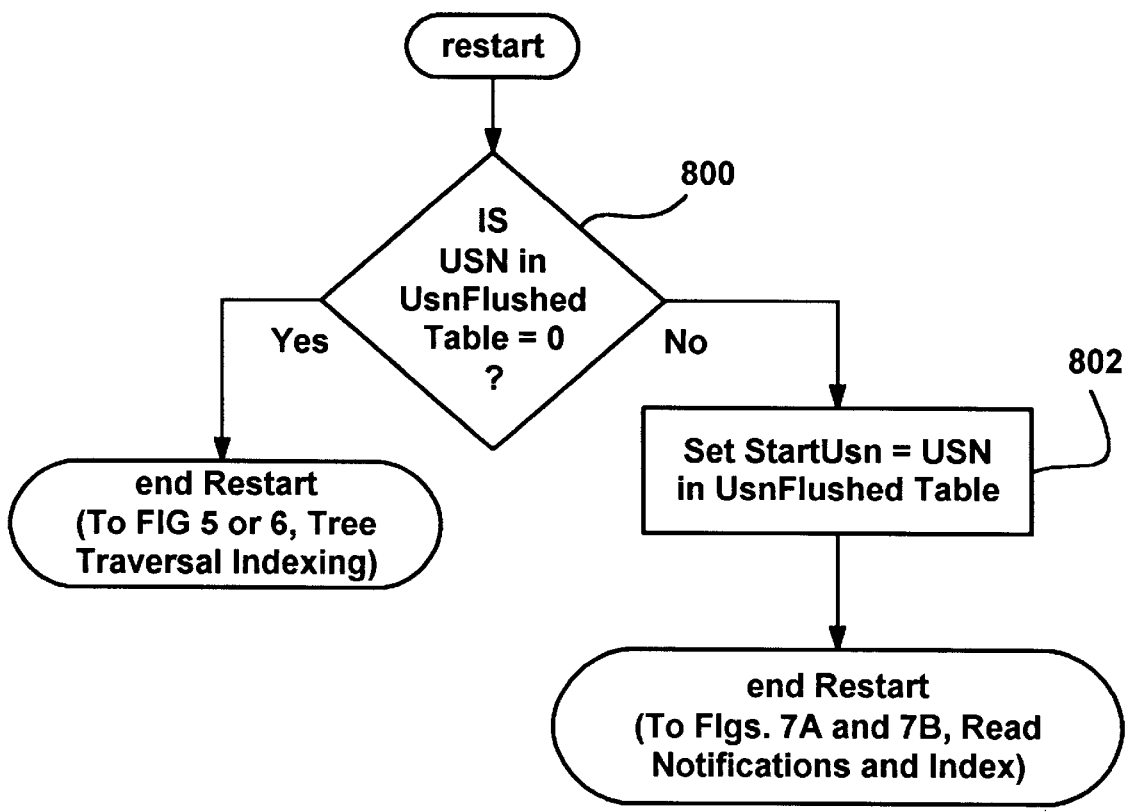
FIG. 8 is a flow diagram representing the general steps taken to restart the indexing program in accordance with another aspect of the present invention.

In any event, the initial indexing process then continues to FIG. 8, where the Index Server 60 will monitor changes to documents by reading the USN Log 62 beginning at the value in the UsnFlushed table 76, which at this time ordinarily equals UsriMax. However, it is possible that the initial tree traversal was not successfully completed. Thus, beginning at step 800 of FIG. 8, the USN value is read from the UsnFlushed table 76 and tested to determine if this value equal zero. If zero, this indicates that the tree traversal was not successfully completed (i.e., step 510 did not properly execute following a successful tree traversal). If so, a tree traversal is again attempted.

Note that it is possible to checkpoint a tree traversal as an optimization, such that if the tree traversal fails, when restarting the tree traversal (when the UsnMax is still zero), it is not necessary to start from the very beginning. For example, the sub-directories that have been successfully traversed can be persistently noted in a table or similar data structure on disk. Then, if there is a crash before the tree traversal completes, the table is read from disk, and noted directories need not be traversed again. The restart process can be refined to require less work by using more directory levels.

Ordinarily, the initial tree traversal is successful, and thus the USN does not equal zero at step 800 whereby the process branches to step 802. At step 802, the StartUsn parameter is set equal to the value in the USN Log 62, so that the USN log 62 will be read from the last-indexed USN forward, that is, beginning at UsnMax. The process continues to FIG. 7A wherein the USN records will be read and indexed in keeping with the invention. Note that changes to documents may have occurred between the time that UsnMax was written to the UsnFlushed table 76 (step 506) and the time that step 802 was executed, whereby the value in the UsnFlushed table 76 is no longer the maximum USN in the USN Log 62. If so, the notification records are then read and indexed as described below with respect to FIGS. 7A–7B.

It also frequently occurs that no new USN notification records greater than or equal to UsnMax are present in the USN Log 62, i.e., no new records have been added because no documents have yet changed. In keeping with the invention, when there are no notifications pending, Index Server 60 runs in the background waiting for notifications of document changes. Index Server 60 may wait for notifications in one of two ways. First, the wait can be implemented by polling, whereby Index Server 60 periodically checks if there are new USN notifications. More preferably, however, the wait is accomplished by blocking where a separate thread waits until it is signaled that there is a new USN notification.

Figure 7B:
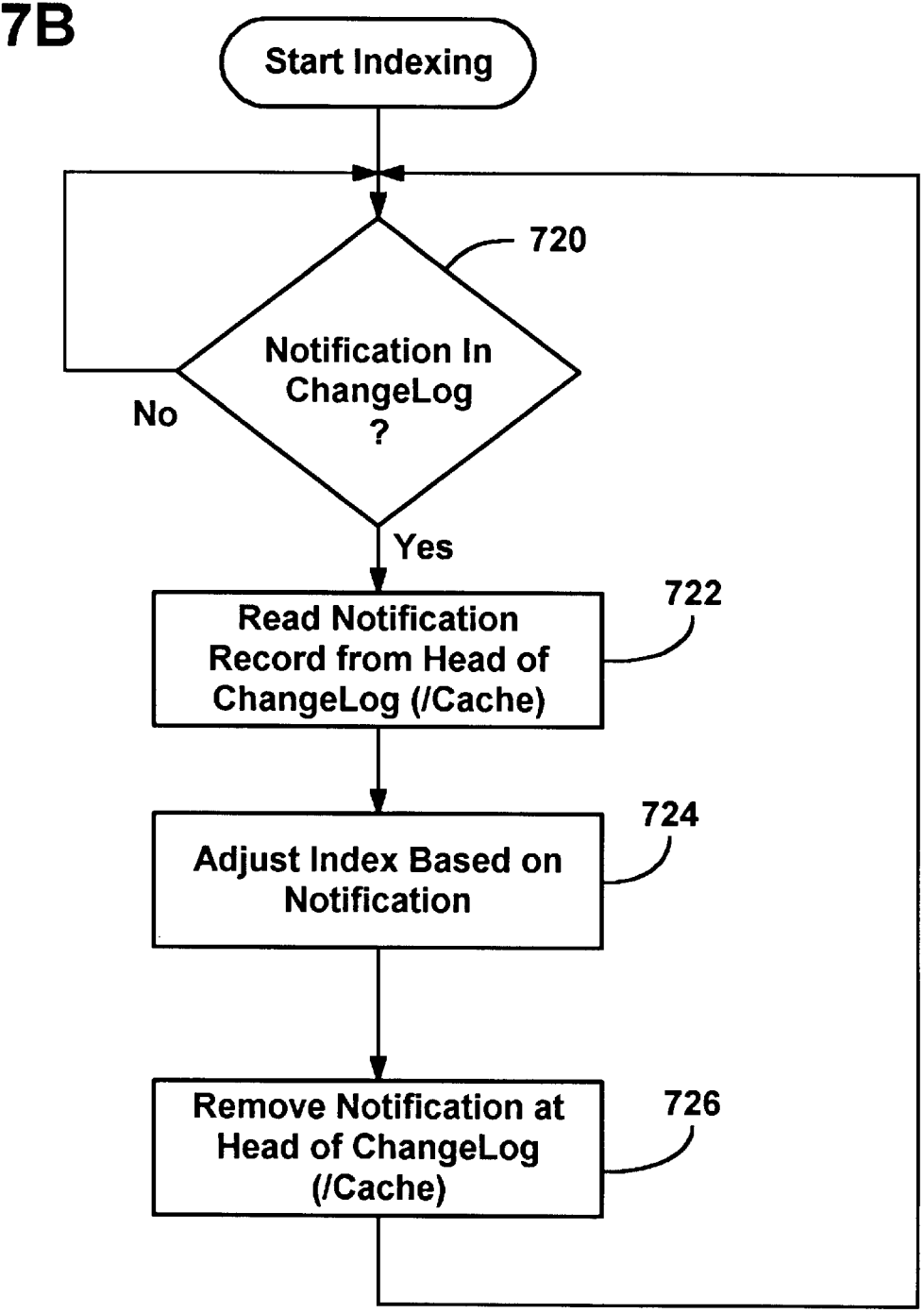
FIG. 7B is a flow diagram representing the general steps taken to index documents based on notifications in accordance with another aspect of the present invention.

FIGS. 7A–7B generally represent the Index Server 60 process during its typical operation. Beginning at step 700, Index Server 60 creates a separate thread that waits for a new USN notification (or periodically polls for notifications). Note that if the polling model is used, Index Server 60 performs its other operations between polling operations, such as periodically serializing the ChangeList 72 to the ChangeLog 74 (steps 706–712) and indexing files based on any change notifications serialized in the ChangeLog 74 (steps 720–726). Whether by polling or blocking, if a new USN notification (or other message such as an error code) is received, step 702 tests whether the notification is a valid notification corresponding to a changed document, or an indication of an error.

In the typical situation where a notification is received and no error is present, step 702 branches to step 704 where the USN notification record is placed in the in-memory-linked ChangeList (FIFO queue) 70. As previously described, the in-memory ChangeList 70 is periodically serialized into the persistent ChangeLog 74. To this end, step 706 detects the appropriate period for serializing, and until the period is reached returns to step 700 to await and queue new notifications. When the cycle for serialization is reached, step 706 branches to step 708 wherein the ChangeList 70 is serialized into the persistent ChangeLog 74. Then, at step 710, the ChangeList 70 is moved into the in-memory, serialized ChangeList (cache) 75 and the ChangeList 70 is emptied. Of course, the serialization period need not be an actual time duration, but can alternatively be based on some other factor, such as the number of notifications in the ChangeList 70. Once the change list has been emptied, step 710 writes the number of the last USN that was serialized into the Usn-Flushed table 76.

FIG. 7B represents the general re-indexing operation based on the USN notification records serialized into the ChangeLog 74. Note that because indexing preferably executes on a separate thread than the thread that waits for notifications, the steps in FIG. 7B run in parallel with those in FIG. 7A. Alternatively, in the polling model, the steps of FIG. 7B can be integrated with those in FIG. 7A such as by executing steps 720–726 while awaiting new USN notifications and between periodic serializing times. In any event, step 720 determines if a serialized notification is pending in the ChangeLog 74, and if not, returns to wait for one or more notification records. Note that the wait for new records in the persistent ChangeLog 74 is not the same as the wait for new USN notification records in the USN Log 62. If at least one record is present, the first notification record is read from the head of the FIFO ChangeLog 74 (or the cache 75, if records are present therein) at step 722. Then, the indexes 68 are updated according to the document identified in the notification record at step 724, and if successfully updated, the notification record is removed from the head of the ChangeLog 74 (or the cache 75) at step 726. Step 726 returns to step 720 where the next notification record, if any, is processed in the same manner.

Before a planned shutdown such as a shutdown due to low resource conditions, Index Server 60 will empty the ChangeList 70 and stop reading USN notifications from the USN log 62. Similarly after an abrupt shutdown to do a crash, Index Server 60 will be unable to read USN notifications from the USN log 62. However the file system 64 is responsible for adding notification records to the USN log 62, and thus notification records will continue to be added to the USN log 62 even when Index Server 60 shuts down.

In accordance with another aspect of the present invention, after Index Server 60 is restarted, (e.g., the low resource situation is cleared), Index Server 60 returns to the restart process of FIG. 8, i.e, Index Server 60 reads the last successfully processed USN from the UsnFlushed table 76 and starts reading the USN Log 62 from that USN value onwards.

Note that at step 702 of FIG. 7A, an error may result from an attempt to read a record from a portion of the USN Log 62 that is no longer present. More particularly, since the file system 64 creates and appends a new notification record to the USN Log 62 for every document change, the USN Log 62 continues to increase in size. In order to conserve space, the maximum size of the USN Log 62, and a size of the USN Log 62 to deallocate when the maximum size is reached, are user-configurable. As a result, the file system 64 may periodically deallocate a portion of the USN Log 62 from the front of the USN Log 62. Deallocation from the front of a file is described in U.S. patent application Ser. No. 08/813, 621, now U.S. Pat. No. 5,890,147, entitled "Method and Mechanism for Freeing Disk Space in a File System," assigned to the assignee of the present invention and herein incorporated by reference in its entirety.

Deallocated USN records are no longer available for reading, and an error code (identifying a failed attempt to read deallocated space) is returned when attempting to read a deallocated USN record. In a situation where there is a large number of notifications received by Index Server 60 in a very short time, whereby Index Server 60 is unable to keep up with the pace of incoming notifications, and a corresponding portion of the USN Log 62 has been deallocated, then Index Server 60 will receive the appropriate error code. In such an event, Index Server 60 needs to update its indexes, but cannot use the now-deallocated USN Log 62. Accordingly, to accomplish the updating, Index Server 60 performs a seen-array-processing tree traversal by performing the steps of FIG. 6.

However, step 740 first saves the maximum USN in the USN Log 62 in the UsnMax variable. Then, a USN of zero is written to the UsnFlushed table 76 at step 742. As previously described, a USN of zero UsnFlushed table 76 acts as a flag to indicate whether the traversal is successful, i.e., if successful the USN in the UsnFlushed table 76 is changed from zero.

Next, the seen array processing is performed, shown in more detail in FIG. 6 beginning at step 600. First at step 600, an array of Boolean flags called the seen array, one flag for each document in the indexes, has each of its entries set equal to a value of doc_not_seen. Then at step 602 a document in the filesystem 62 is selected using a tree traversal algorithm, for example by using a well-known algorithm such as breadth-first or depth-first searching. Step 604 tests whether the selected document is present in the internal indexes 68. If the document is not present in the internal indexes 68, then it is a new document that was added while Index Server 60 was not able to process the notifications. Accordingly, step 606, which adds non-indexed documents to a to-be-indexed list, will be performed for such a document.

If the document was in one or more of the indexes 68, step 604 branches to step 608 whereby the document's seen array flag is set equal to doc_seen. A synchronization test is performed at step 610 compare the time at which the document was last updated in the index (the index write time) against the last time the document was written in the filesystem 64. If the write times indicate synchronization, the process branches to step 612. If the two are not synchronized, step 610 branches to step 606 where the document is added to the to-be-indexed list, and then the process continues to step 612. Step 612 repeats the seen-array-processing by returning to step 602 until no additional documents are found in the tree traversal.

Once all documents have been scanned, the process continues to step 614. As can be appreciated, documents which are in the indexes 68 but are not found in a traversal of an appropriate tree were deleted while Index Server 60 was unable to receive USN notification records corresponding to the deletions. Accordingly, at step 614 any documents whose flags are still unchanged from doc-not-seen are removed from the indexes 68. Lastly, at step 616, any documents in the to-be-indexed list are indexed by Index Server 60.

Step 616 returns to step 744 of FIG. 7A, wherein the saved UsnMax value is written to the UsnFlushed table 76. Note that if the tree traversal was not performed successfully, a zero remains in the UsnFlushed table 76, whereby the tree traversal would be attempted again. The Index Server process 60 then continues to FIG. 8, where the Index Server 60 will monitor changes to documents by reading the USN Log 62 beginning at the value in the UsnFlushed table 76, which at this time ordinarily equals UsnMax.

Figure 9:
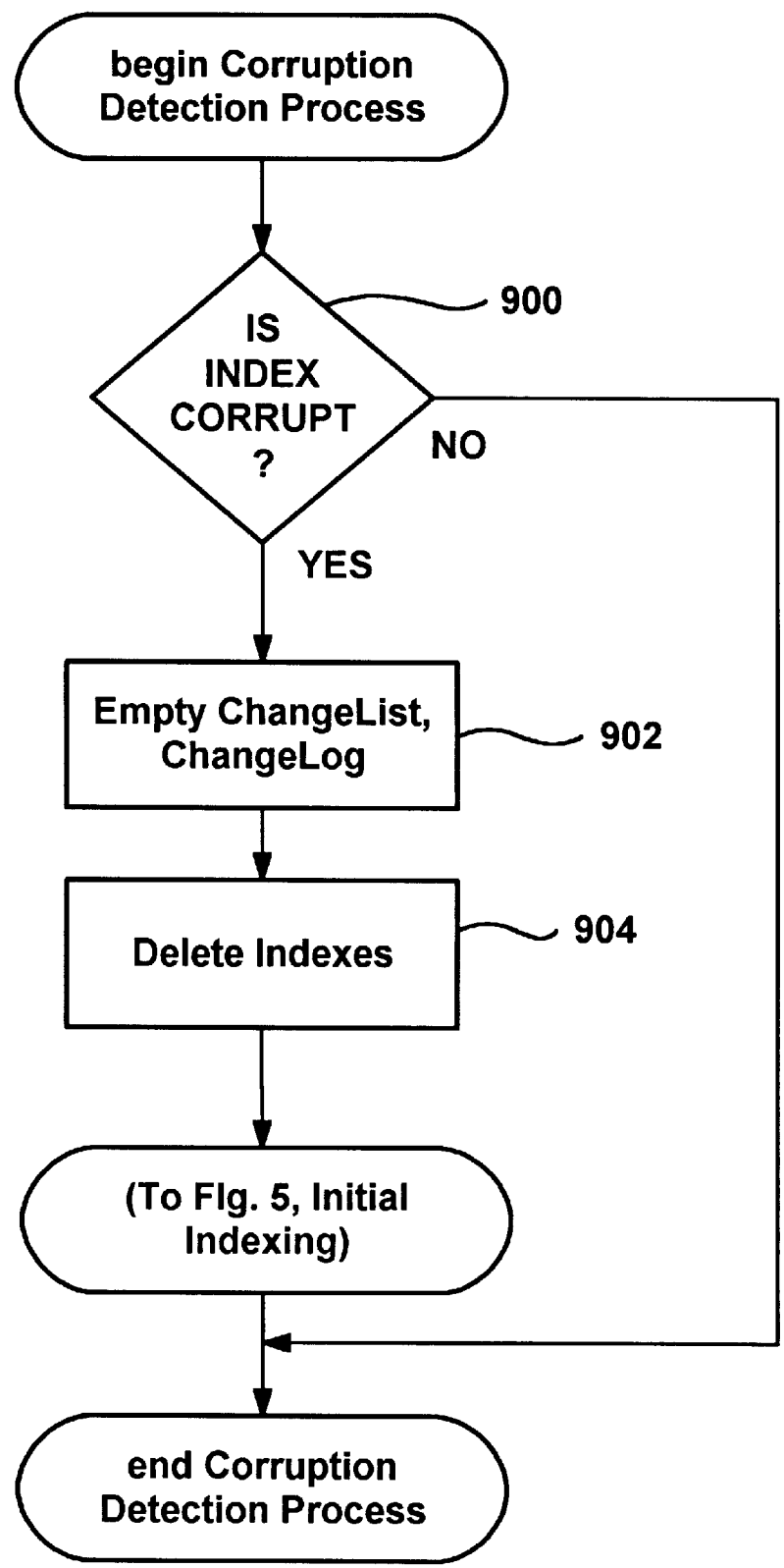
FIG. 9 is a flow diagram representing general steps taken when a corrupt index is detected.

Even though care (e.g., transactional copying) is taken to keep persistent data structures such as the indexes 68 and the ChangeLog 74 from getting corrupted, Index Server 60 can handle the rare case wherein such persistent data structures become corrupted. A test for such corruption can be performed wherever appropriate, such as by file system checks, or by Index Server 60 itself. As generally shown in FIG. 9, when Index Server 60 becomes aware of the corruption at step 900, Index Server 60 deletes all its internal indexes 68 at step 902 and empties the ChangeList 70 and ChangeLog 74 at step 904. Then, a USN of zero is written to the UsnFlushed table 76 and an initial tree traversal of the volume is done, just as if the volume were being indexed for the very first time. As can be readily appreciated, this properly reconstructs the indexes 68.

As another enhancement, Index Server 60 allows just a portion of the volume to be indexed. For example, instead of indexing the entire c:\ volume, a user may wish to index only the directories c:dir1, c:\dir2 and the directory trees rooted under those two directories. In such an event, instead of traversing the entire volume during the initial tree traversal, only the relevant directory trees need to be traversed. Since the NT filesystem 64 maintains a USN log 62 for the entire volume on a per volume basis, only those USN notifications that refer to documents in the specified list of directories need to be processed.

By way of example, assume the USN notification record contains the full path of the document, such as c:\dir1\patent.doc, and further that the list of directories being indexed is {c:\dir1, c:\dir2}. Since c:\dir1 is a prefix of c:\dir1\patent.doc, this particular USN notification record should be processed. However, for a document such as c:\dir3\review.doc, there is no prefix match, and thus any USN notification record therefor should be ignored. To filter only relevant documents and/or notification records, a filtering mechanism may be used, such as described in U.S. patent application Ser. No. 08/813,618, pending, entitled "Scope Testing of Documents in a Search Engine Using Document to Folder Mapping," assigned to the assignee of the present invention and herein incorporated by reference in its entirety. Such a mechanism allows a list of directories to be compiled for inclusive filtering based thereon, and another such list for exclusive filtering.

Moreover, Index Server 60 allows the list of directories being indexed to be changed dynamically when the Index Server 60 is running. To this end, when a directory tree is newly added to an index 68, a tree traversal (as described above) is performed to add documents in that tree to the indexes 68. Then, the directory is added to the list of directories that are used to filter USN notification records. Conversely, when a directory tree is removed, the tree is removed from the list of directories that are used to filter USN notification records. Seen-array processing as previously described with reference to FIG. 6 is then performed to remove all documents in that directory tree from Index Server's internal indexes 68.

Although not necessary to the invention, Index Server 60 can index more than one volume, e.g., c:\ and d:\. If both volumes are NTFS volumes, the NT file system 64 provides a separate USN log 62 for each NT volume, and USN notification records from two different volumes are independent from one another. To maintain the independent relationship, Index Server 60 assigns a unique identifier, called a VolumeId, to each volume. When a USN notification is read from the USN log 62, it is tagged with the unique VolumeId for that volume. The format of the UsnFlushed table 76 is arranged to store a Usnax for every volume that is being indexed, and to grow as new volumes are indexed. When the ChangeList 70 is serialized into the ChangeLog 74, the UsnMax for each VolumeId is written to the Usn-Flushed table 76. If there are no notifications for a given VolumeId, then the UsnMax for that VolumeId is not updated. Note that the volumes indexed by Index Server 60 need not be restricted to local volumes only, but instead may be remote shares in the UNC naming convention, i.e. \\server name\share. Each remote share is also assigned a unique VolumeId.

Figure 10:
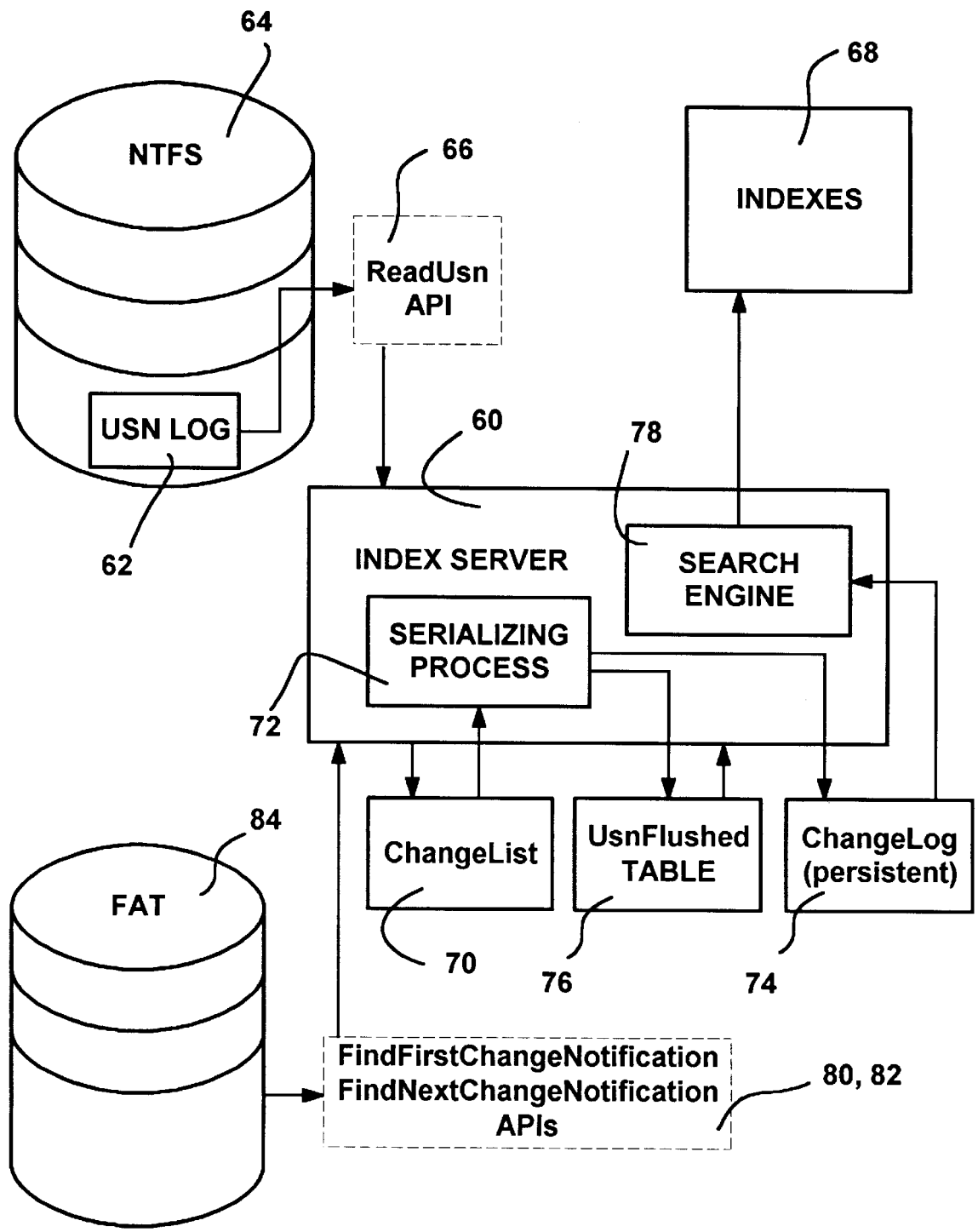
FIG. 10 is an alternate block diagram illustrating various components of the present invention including multiple volumes and alternate file systems.

Lastly, as shown in FIG. 10, Index Server 60 and the present invention are sufficiently flexible and extensible to allow the combination of the scan-based Find-FirstChangeNotification and FindNextChangeNotification monitoring scheme with the USN-based monitoring scheme of the present invention. The invention is also compatible with file systems that provide no notification mechanism, whereby indexes for the files thereof are updated by periodically scanning those files for changes. The Windows NT operating system allows for simultaneously loaded different file systems, such as NTFS and FAT, on a volume by volume basis. To this end, Index Server 60 persistently remembers which monitoring scheme is being used for a given volume and uses that monitoring scheme after startup. Of course, the significant speed and efficiency advantages described herein are found with a USN-based monitoring scheme or similar scheme.

As can be seen from the foregoing detailed description, there is provided an improved method and system for determining which documents have changed between a shutdown and start-up of a file system monitoring program such as a document indexing program. The method and system determines changed documents in a substantially faster manner, while making the indexing process more efficient. The method and system is reliable, robust, efficient, flexible and extensible.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer system having a file system of documents, wherein the file system stores document change information in a persistent log of records, a method of updating at least one other file of document information, comprising the steps of, receiving notification of an addition to the persistent log, reading a record from the persistent log, processing the record to obtain change information about a document and a sequence number representative of the position of the document change information relative to other document change information, updating the other file based on the change information of the document, and recording the sequence number of the record in a persistent storage.

2. The method of claim 1 wherein the step of processing the record includes the steps of writing the record to a memory, periodically serializing the record into a persistent data structure and reading the record from the persistent data structure.

3. The method of claim 1 wherein the step of processing the record includes the steps of writing the record to a memory, periodically serializing the record into a cache, structure and reading the record from the cache.

4. The method of claim 1 wherein the records are serially added to the log file and the sequence number corresponds to a location of each record in the log file.

5. The method of claim 1 wherein the step of updating the other file includes the steps of obtaining a document identifier and the change information from the record that was read from the persistent data structure, providing the document identifier and the change information to a search engine for updating the other file, and removing the record from the persistent data storage.

6. The method of claim 1 further comprising the steps of retrieving the sequence number of the record from the persistent storage, and reading a record from the persistent log based on the sequence number retrieved.

7. The method of claim 6 further comprising the steps of reading at least one other record from the persistent log that is later in sequence than the record corresponding to the retrieved sequence number, and processing that record to obtain change information about a document corresponding thereto.

8. The method of claim 1 further comprising the steps of receiving directory information from a user, reading a plurality of sequential records from the log file, filtering the plurality of records based on the directory information to obtain a subset of records, and processing the subset of records to obtain change information about a plurality of documents and sequence numbers representative of the location of the records in the log file.

9. The method of claim 1 further comprising the step of waiting for the notification.

10. The method of claim 9 wherein the step of waiting for the notification of the new record comprises the step of polling for the notification.

11. The method of claim 9 wherein the step of waiting for the notification of the new record comprises the step of awaiting the receipt of a signal indicative of the new record.

12. The method of claim 1 wherein the other file is an index containing document properties, and wherein the step of updating the other file includes the step of modifying the index based on a changed property of the document.

13. The method of claim 1 wherein the documents are stored on a plurality of volumes, wherein the file system serially stores document change information in a plurality of persistent logs of records, with each log corresponding to a volume, and further comprising the step of attaching a volume identifier to each record read from one of the logs.

14. In a computer system having a file system of documents, wherein the file system stores information about changed documents in a persistent log of records, and wherein each record contains a document identifier corresponding to the document, a system for updating at least one index which includes document properties, comprising, means for receiving a notification of a new record in the log, an interface for reading the new record from the persistent log, means for processing the record to obtain the document identifier and change information about the document corresponding thereto, and a search engine for updating the index based on the document identifier and the change information.

15. The system of claim 14 wherein each record further includes a sequence number indicative of the relative position of the record in the log, and wherein the means for processing the record includes means for obtaining the sequence number therefrom, and further comprising a persistent data structure for recording the sequence number of the new record.

16. The system of claim 15 further comprising means for retrieving the sequence number from the persistent data structure, and means for providing a value based on that sequence number to the interface for reading a record corresponding to the value.

17. The system of claim 15 wherein the documents are stored on a plurality of separate volumes and wherein the file system serially stores the document change information in a plurality of persistent logs of records, with each log corresponding to a volume, further comprising means for attaching a volume identifier to each record read from one of the logs, and wherein the persistent data structure for recording the sequence number of the new record includes a plurality of locations for recording a sequence number for each separate volume.

18. The system of claim 15 further comprising at least one other file system that does not store information about changed documents in a persistent log of records, and further comprising means for receiving other change notifications from the other file system and means for updating another index based on the other change notifications.

19. The system of claim 14 further comprising a memory for storing the record read from the log, means for serializing the record into a persistent data structure, and wherein the means for processing the record includes means for reading the persistent data structure.

20. The system of claim 14 wherein the means for receiving a notification includes means for receiving a signal from the file system.

21. The system of claim 14 wherein the means for receiving a notification includes a polling mechanism.

22. In a computer system having a file system of documents, wherein the file system stores document change information in a persistent log of records, a method of updating at least one index of document properties with document information, comprising the steps of, reading a record from the persistent log, processing the record to obtain change information about a document and a sequence number representative of the relative position of the record in the log file, updating the index based on the change information of the document by modifying the index based on a changed property of the document, and recording the sequence number of the record in a persistent data structure.

23. The method of claim 22 further comprising the steps of retrieving the sequence number of the record from the persistent data structure, and reading a record from the persistent log based on the sequence number retrieved.

24. The method of claim 23 further comprising the steps of reading at least one other record from the persistent log that is later in sequence than the record based on to the retrieved sequence number, and processing the other record to obtain change information about a document corresponding thereto.

25. The method of claim 22 further comprising the steps of receiving directory information from a user, reading a plurality of sequential records from the log file, filtering the plurality of records based on the directory information to obtain a subset of records, processing the subset of records to obtain change information about a plurality of documents and sequence numbers representative of the location of the records in the log file, updating the index based on the change information of the documents, and recording the sequence number of the record having the highest sequence number in a persistent data structure.

26. The method of claim 22 further comprising the steps of waiting for a notification of a new record added to the persistent log and receiving the notification.

27. The method of claim 26 wherein the step of waiting for the notification of the new record comprises the step of polling the file system for the notification.

28. The method of claim 26 wherein the step of waiting for the notification of the new record comprises the step of awaiting the receipt of a signal from the file system.

29. The method of claim 22 wherein the step of processing the record includes the steps of writing the record to a memory, periodically serializing the record into a persistent data structure and reading the record from the persistent data structure.

30. The method of claim 29 wherein the step of updating the index includes the steps of obtaining a document identifier and the change information from the record that was read from the persistent data structure, providing the document identifier and the change information to a search engine for updating the indexes, and removing the record from the persistent data structure.

31. The method of claim 22 wherein the documents are stored on a plurality of volumes and wherein the file system serially stores document change information in a plurality of persistent logs of records, with each log corresponding to a volume, further comprising the step of attaching a volume identifier to each record read from one of the logs, the volume identifier corresponding to the volume of that log, and wherein the step of recording the sequence number of the record in a persistent data structure includes the step of recording the sequence number in association with the volume identifier.

32. The method of claim 22 further comprising the steps of detecting an error when reading a record, and in response, determining a set of documents indexed in the index, selecting a tree of documents in the file system and selecting each document in that tree, determining if each selected document is indexed in the index, and if not, indexing that document in the index, determining if a document is indexed in the index but is not in the tree and if so, removing the indexing of that document from the index, and if a selected document is in the tree and is indexed in the index, determining if the document in the tree is synchronized with the document in the index, and if not, re-indexing that document.

33. The method of claim 22 further comprising the steps of detecting a corrupt index, and reconstructing the index by scanning a tree of documents in the file system.

34. In a computer system having a source of changeable data wherein change information about changes to the changeable data are provided in a persistent log of records, a method of updating a data structure, comprising the steps of, receiving notification of a change to the persistent log, reading a record from the persistent log, processing the record to obtain data change information and a sequence number representative of the position of that change information relative to other change information, updating the data structure based on the change information of the document, and recording the sequence number of the record in a persistent storage.

35. The method of claim 34 wherein the step of processing the record includes the steps of writing the record to a memory, periodically serializing the record into a persistent data structure and reading the record from the persistent data structure.

36. The method of claim 34 wherein the source of data is a file system.

37. The method of claim 34 wherein the source of data is a database.

38. The method of claim 34 wherein the data structure is a file.

39. The method of claim 34 wherein the data structure is an index.

40. The method of claim 39 wherein the step of updating the other file includes the steps of obtaining a document identifier and the change information from the record that was read from the persistent data structure, providing the document identifier and the change information to a search engine for updating the index, and removing the record from the persistent data storage.

41. In a computer system having a file system of documents, wherein the file system stores document change information in a persistent log of records, a method of updating at least one index comprising document properties, comprising, reading a record from the persistent log, processing the record to obtain change information about a document and a sequence number representative of the position of the document change information relative to other document change information, updating the index based on the change information of the document by modifying the index based on a changed property of the document, and recording the sequence number of the record in a persistent storage.

42. In a computer system having a file system of documents stored on a plurality of volumes, wherein the file system serially stores document change information in a plurality of persistent logs of records with each log corresponding to a volume, a method of updating at least one other file of document information, comprising, reading a record from one of the persistent logs, attaching a volume identifier to the record read, processing the record to obtain change information about a document and a sequence number representative of the position of the document change information relative to other document change information, updating the other file based on the change information of the document, and recording the sequence number of the record in a persistent storage.

43. A computer-readable medium having computer-executable instructions for performing steps to update an index, wherein change information about changes to a source of changeable data are maintained in a persistent log, the steps comprising:

reading a set of change information from the persistent log;

processing the set of change information to obtain data change information and a sequence number representative of the position of the set of change information relative to other change information;

updating the index based on the change information of the document, including obtaining a document identifier and the change information from the set that was read from the persistent data structure, providing the document identifier and the change information to a search engine for updating the index, and removing the set of change information from the persistent data storage; and recording the sequence number of the set in a persistent storage.

44. In a computer system having a file system of documents, wherein the file system stores document change information in a persistent log of records, a method of updating at least one other file of document information, comprising, reading a record corresponding to a document from the persistent log, appending the record to a queue independent of whether the queue has another corresponding record queued for the document, processing the record to obtain change information about the document and a sequence number representative of the position of the document change information relative to other document change information, and updating the other file based on the change information of the document.

* * * * *

UNITED STATES PATENT AND TRADEMARK OFFICE
CERTIFICATE OF CORRECTION

PATENT NO.      : 6,067,541
DATED           : May 23, 2000
INVENTOR(S)     : Raju et al.

It is certified that error appears in the above-identified patent and that said Letters Patent is hereby corrected as shown below:

Column 2,
Line 5, "as a breadth-first" should read -- as breadth-first --.

Column 5,
Line 33, "identify" should read -- identifies --.
Line 33, "describe" should read -- describes --.
Line 43, "USN's" should read -- USNs --.

Column 6,
Line 6, "$62^1$" should read -- $62_1$ --.
Lines 11 and 44, "622" should read -- $62_2$ --.

Column 7,
Line 3, "621" should read -- $62_1$ --.
Line 60, "UsriMax." should read -- UsnMax. --.
Line 64, "equal" should read -- equals --.

Column 8,
Line 16, "log" should read -- Log --.

Column 9,
Lines 31, 33, 34 and 36, "log" should read -- Log --.
Line 31, "to do" should read -- due to --.

Column 10,
Line 35, "filesystem" should read -- file system --.
Line 44, "which are in the indexes but are not found" should read -- which were in the indexes but were not found --.
Line 48, "doc-not-seen" should read -- doc_not_seen --.

Column 11,
Line 13, "c:dir1" should read -- c:\dir1 --.
Line 17, "filesystem" should read -- file system --.
Lines 17, 54 and 59, "log" should read -- Log --.
Line 23, "dir1" should read -- dir1 --.
Line 61, "Usnax" should read -- UsnMax --.

Column 12,
Line 61-62, "cache, structure and" should read -- cache structure, and --.

UNITED STATES PATENT AND TRADEMARK OFFICE
CERTIFICATE OF CORRECTION

PATENT NO. : 6,067,541
DATED : May 23, 2000
INVENTOR(S) : Raju et al.

It is certified that error appears in the above-identified patent and that said Letters Patent is hereby corrected as shown below:

Column 14,
Line 42, "based on to the" should read -- based on the --.

Signed and Sealed this

Ninth Day of November, 2004

JON W. DUDAS
*Director of the United States Patent and Trademark Office*